Figure 1:
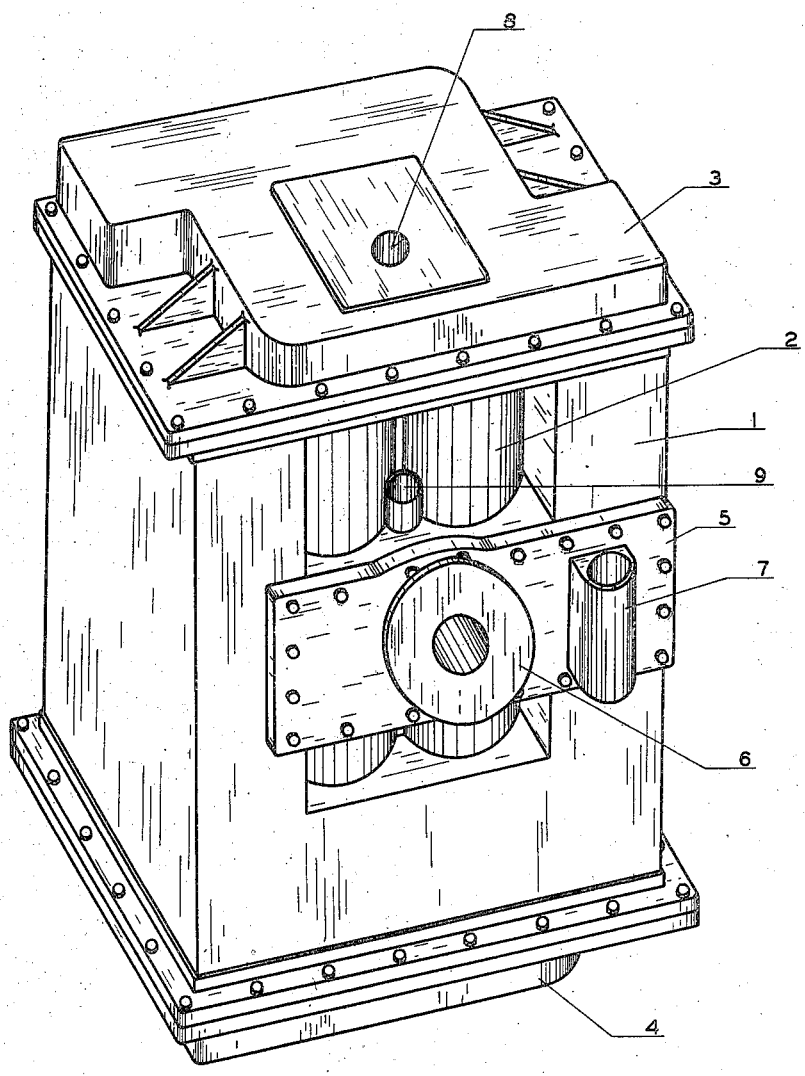

Dec. 28, 1937.                L. McCANDLESS                2,103,482
                        LIQUID MEASURING DEVICE
                         Filed Aug. 20, 1935              4 Sheets-Sheet 2
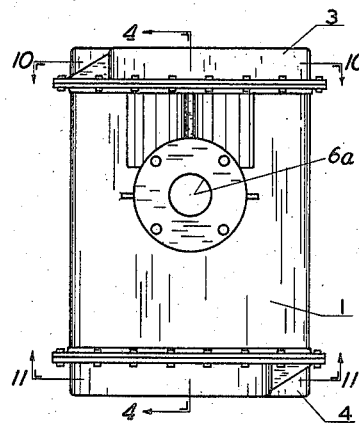
FIG_2
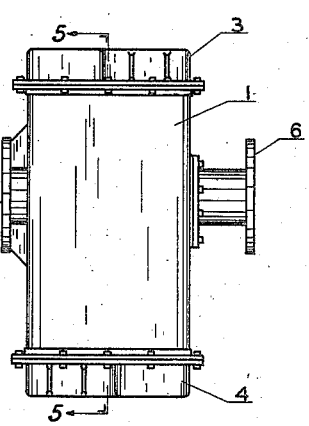
FIG_3
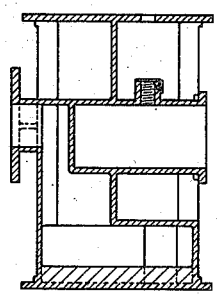
FIG_4
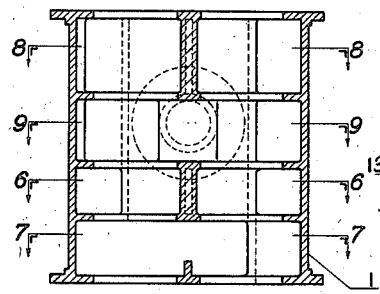
FIG_5
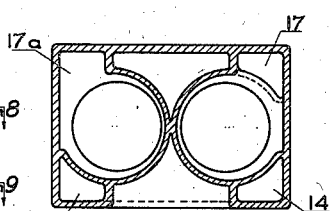
FIG_6
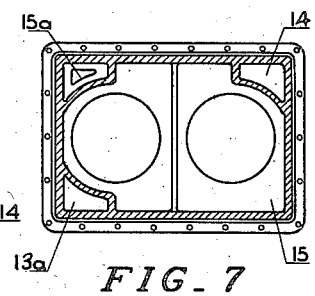
FIG_7
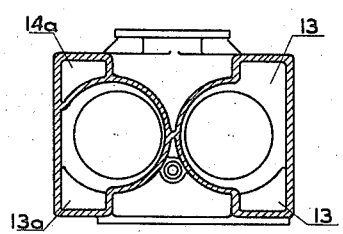
FIG_8
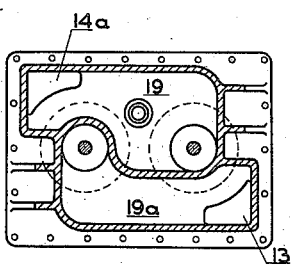
FIG_10
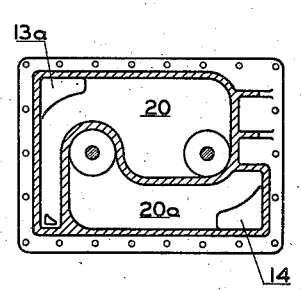
FIG_11
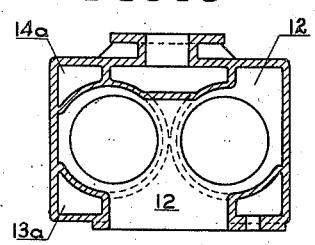
FIG_9
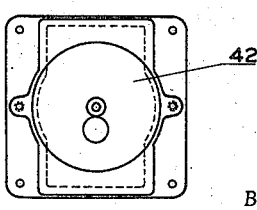
FIG_12
INVENTOR.
Lyon McCandless
BY William B. Jaspert
ATTORNEY.

Dec. 28, 1937.     L. McCANDLESS     2,103,482
LIQUID MEASURING DEVICE
Filed Aug. 20, 1935     4 Sheets—Sheet 3
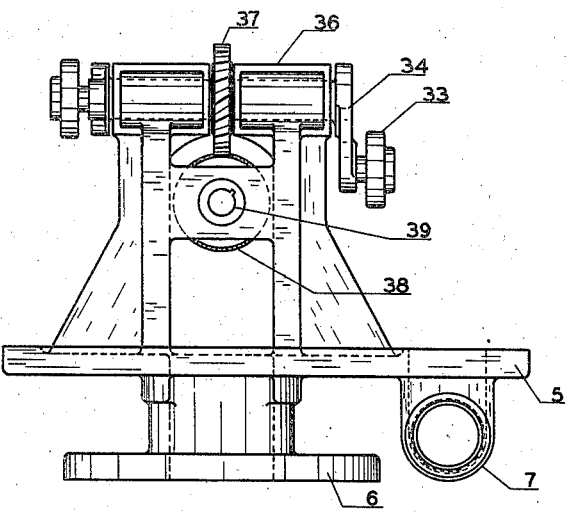
FIG_13
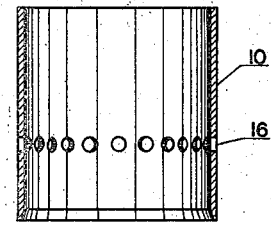
FIG_14
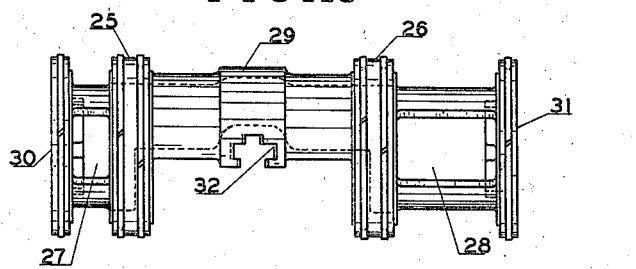
FIG_16
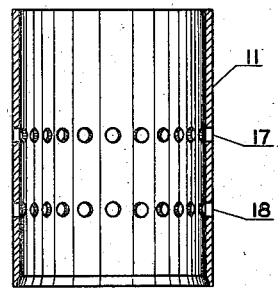
FIG_15
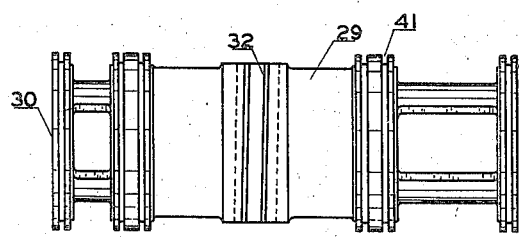
FIG_17
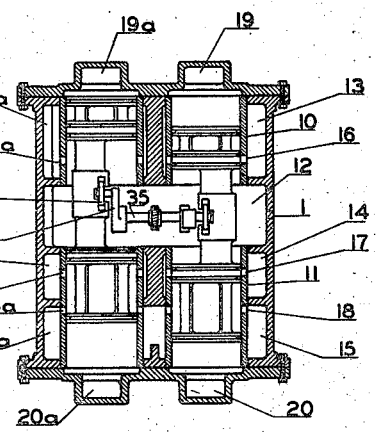
FIG_20
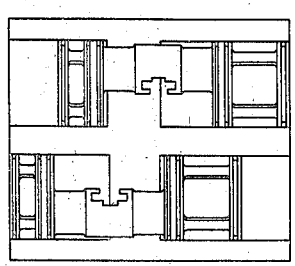
FIG_18
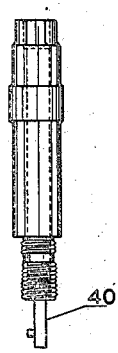
FIG_19
INVENTOR.
Lyon McCandless
BY William B. Jaspert
ATTORNEY.

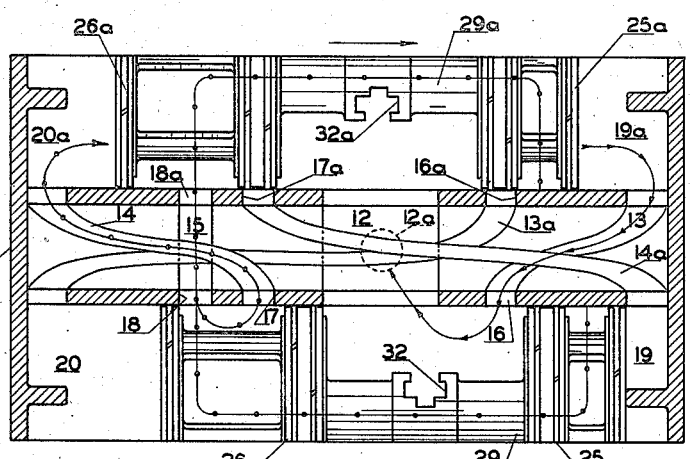
FIG_21
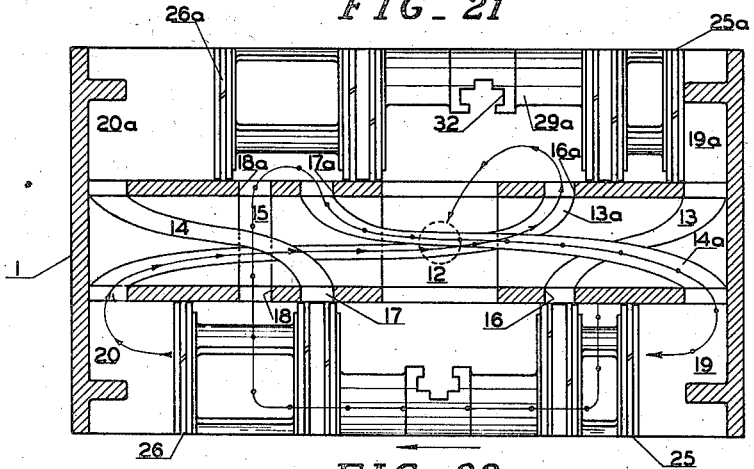
FIG_22
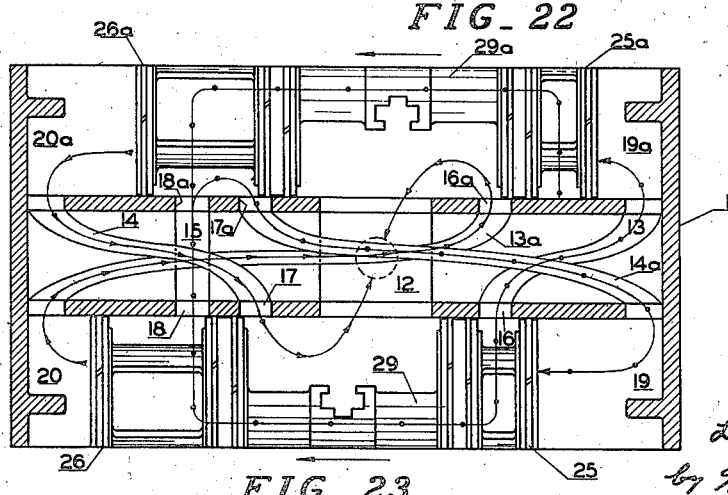
FIG_23
INVENTOR
Lyon McCandless
by William B Jaspert
Attorney.

Patented Dec. 28, 1937

2,103,482

UNITED STATES PATENT OFFICE 2,103,482

LIQUID MEASURING DEVICE

Lyon McCandless, Beaver Falls, Pa.

Application August 20, 1935, Serial No. 37,027

8 Claims. (Cl. 73—242)

This invention relates to new and useful improvements in liquid measuring meters of the piston type, and it is among the objects thereof to provide a construction in which the piston element for measuring the displacement of the fluid flowing therethrough also functions as a valve for controlling the flow passages to and from the measuring cylinders.

Another object of the invention is the provision of means for mounting the displacement pistons of the meter with their longitudinal axes vertically disposed thereby preventing excessive and uneven wear on the pistons and cylinders.

Still a further object of the invention is the provision of a meter design which shall consist of a minimum number of operating parts of simple construction thereby increasing the life of the meter while maintaining the accuracy and measuring efficiency thereof.

Conventional types of liquid measuring meters embody multiple measuring cylinders in which piston elements are operated in pairs, each pair being connected by a yoke which, through a crank shaft or other operating mechanical linkage, actuates a valve that controls the flow of the fluid to and from the cylinder. Such meters and the valve mechanism incident thereto depend for accuracy upon the design and construction of the valve and actuating mechanism. Wear incident to their use must be compensated for by complex adjusting mechanism. The conventional form of meter has the measuring cylinders and pistons horizontally disposed with respect to their longitudinal axes, which places the entire weight of the sliding piston on a constricted portion of the cylinder walls, resulting in additional wear. These difficulties inherent in the prior art devices are overcome in the present invention which, in addition thereto, employs a minimum number of meter parts, with resultant economy in the manufacture thereof.

In accordance with the present invention, a plurality of displacement pistons are operatively disposed in cylinders arranged in pairs with their axes in a vertical position, each piston also constituting valves to control the flow passages of the cylinders of cooperating pistons. This construction eliminates the need for extra valve chambers and particularly the mechanical linkage that connects the displacement piston with the valve in the conventional type of meter.

The invention will become more apparent from a consideration of the accompanying drawings constituting a part hereof in which like reference characters designate like parts and in which:

Fig. 1 is a view in perspective of a meter housing embodying the principles of this invention;

Fig. 2 a rear elevational view thereof;

Fig. 3 a side elevation;

Fig. 4 a vertical cross-section taken along the line 4—4 of Fig. 2;

Fig. 5 a vertical cross-section taken along the line 5—5 of Fig. 3;

Figs. 6 and 7 horizontal sections taken along the lines 6—6 and 7—7, respectively, of Fig. 5;

Figs. 8 and 9 horizontal cross-sections taken along the lines 8—8 and 9—9, respectively, of Fig. 5;

Fig. 10 a horizontal section taken along the line 10—10 of Fig. 2;

Fig. 11 a horizontal section taken along the line 11—11 of Fig. 2;

Fig. 12 a plan view of an adapter plate for the meter register mechanism;

Fig. 13 a side elevation of a bearing support and crank shaft mounting for the piston members;

Figs. 14 and 15 vertical sections of the cylinder liners for the piston members;

Fig. 16 a side elevation of a piston element;

Fig. 17 a similar view of the piston element taken at right angles to the view of Fig. 16;

Fig. 18 a view diagrammatically illustrating the arrangement of a pair of piston elements;

Fig. 19 a side elevation of a sleeve and shaft for operating the meter register mechanism;

Fig. 20 a vertical sectional elevational view of the meter housing and piston valve assembly; and Figs. 21 to 23 inclusive, diagrammatic views illustrating the operating cycle of the metering device.

In Fig. 1, the numeral 1 designates the meter housing, 2 the cylinder walls, 3 the cover for the cylinders and housing, 4 the base, 5 the crank shaft and register drive bearing assembly provided with a coupling flange 6 to connect the meter to the outlet or discharge line, 7 a housing for a compensating mechanism, and 8 and 9 openings for the register shaft sleeve.

As shown in Fig. 5, the interior of the housing 1 is of ribbed construction which couples strength with light weight and the ribbed construction is cored to receive the liners 10 and 11, Figs. 14 and 15, which are shown assembled in Fig. 20 of the drawings. The liners 10 and 11 are in spaced relation with the wall of the housing and the interior ribbed construction divides-off the housing into an outlet chamber 12 to which the measured fluid is delivered and from which it is conducted through the outlet 6, Fig. 3, to the discharge line.

The spaces formed between the ribs, liners and housing walls are flow passages 13, 13a, 14, 14a, 15, 15a, Fig. 20, which, through ports 16, 16a, 17, 17a, 18 and 18a of the cylinders, communicate with the interior and the ends of the cylinder pistons. End chambers 19, 19a, 20 and 20a communicate with ports 17a, 16, 16a and 17, respectively, through passages 14a, 13, 13a and 14, respectively.

The relation of the end chambers and flow passages is diagrammatically shown in Figs. 21 to 23 inclusive, and in the cross-sectional views of Figs. 6 to 11 of the drawings.

Disposed within the cylinder liners are a pair of pistons, each consisting of piston elements 25 and 26. The pistons are hollow forming intermediate compartments with flow passages 27 and 28 respectively which communicate through a hollow connecting yoke 29, Fig. 16. The pistons are solid at their ends 30 and 31. The yokes 29 are provided with T-slots 32 for receiving rollers 33, Fig. 13, that are mounted on cranks 34 of a crank shaft 35, Fig. 20, which is journalled in a bearing block 36. A gear wheel 37 is mounted to rotate with the crank shaft 35 the gear wheel meshing with a wheel 38 that rotates a hollow shaft 39, which receives a shaft 40 of the register mechanism, that is mounted above the meter housing on the adapter plate 42, Fig. 12. The arrangement of the pistons in pairs as shown in Fig. 20 is such that the cranks 34 are 90° apart.

Referring to Fig. 17 of the drawings, the T-slot 32 is shown slightly inclined from the transverse axis of the piston for the purpose of advancing one piston over the other to shut off the pressure port just before the end of the piston stroke to prevent hammering and to open the inlet port sufficiently at the start of the piston stroke to avoid undue torsional strains in the crank shaft.

The assembly of the bearing block 5 permits its insertion in the side of the housing 1 as shown in Fig. 1 with the crank shaft, cranks and rollers, together with the register shaft, all assembled as shown in Fig. 13. When the meter is connected in a flow system with the flange 6a coupled to the fluid supply source passage 15 and flange 6 with the discharge line 12a, these connections being shown in Fig. 3, the cycle of operation is as diagrammatically illustrated in Figs. 21 to 23 inclusive of the drawings.

In Fig. 21, the pistons 25a and 26a are in the middle of their stroke, travelling to the right. The liquid pushed out or displaced by the piston passes through passageway 13 to the port 16 and to the outlet chamber 12 from which it passes through the outlet 12a Fig. 21 to the service line, the flow to the outlet being shown by the line marked with arrows. The inlet passage 15 permits the fluid delivered to the meter under pressure to flow from ports 18 and 18a, through passage 14, to end chamber 20a, against piston 26a. Pistons 26 and 25 of Fig. 21 have just reached the end of their stroke and are motionless. Further movement of piston 26a to the right results in the position of the pistons as shown in Fig. 22. Since the ends of the piston must be solid so that they may be driven by the inlet liquid, provision must nevertheless be made for conducting the liquid from one end to the other. Therefore, the center of the pistons and yokes 29, 29a are hollow, and where the arrow or dotted lines show no flow, the ports shut off the liquid for that position of the piston. Thus in Fig. 21, the inlet fluid designated by the dotted line is conducted through the port 18a into piston 26a, thence through the hollow yoke to the piston 25a where it is cut off. As shown in Fig. 22, pistons 25a and 26a are at the end of their stroke and are motionless, while pistons 25 and 26 are at mid-stroke, moving to the left. The inlet fluid from ports 18 and 18a is directed against the end wall of piston 25 through passage 14a while the outlet fluid from chamber 20 passes to the outlet chamber 12 through passage 13a, and in Fig. 23 of the drawings, pistons 25a and 26a are at a quarter stroke moving to the left with the crank pin at 135°, while pistons 25 and 26 are on three-quarter stroke, moving to the left with the crank pin at 225°. At this stage of the cycle, the fluid is delivered from the end chambers 20 and 20a through passages 13a and 14 to the outlet chamber 12, while the inlet fluid is directed through the hollow yoke 29 passage 13 and chamber 19a against the end wall of piston 25a and through ports 18a, 17a, passage 14a and chamber 19 against the end wall of piston 25.

As is apparent from Figs. 16 and 17 of the drawings, the pistons are provided with annular grooves 41 for receiving piston rings to obtain an annular flexible seal, and it is apparent from the diagrams of Figs. 21 to 23 inclusive, that at least one ring always seals between the inlet passage 15 and outlet passage 12a. It is also evident that the pair of intermediate compartments connected to the inlet are larger than the other intermediate compartments.

The object of inclining the T-slots 32 in yokes 29, as shown in Fig. 17, is to advance the movement of one piston so as to buffet the other piston as it comes to the end of its stroke, thereby cutting off the force of the pressure acting against such piston before the piston reaches the end of the stroke and to open the inlet port at the beginning of the piston stroke. It will be apparent that the rollers 33 engaging the T-shaped slots 32 of the piston yokes are subjected to sliding movement in the slots in response to the piston travel, thereby actuating the cranks 34 which on opposite pistons are 90° apart. Inasmuch as each piston valves the flow of its cooperating piston, thereby controlling their respective movements, the slight inclination of the slots 32 will, through the positive connection of the cranks and rollers, advance the pistons just enough to shut off the pressure fluid acting to advance the other piston to prevent hammering of the piston as it approaches its stop position. This will be apparent from the diagram of piston movement shown in Fig. 23 of the drawings wherein piston 26 will cut-off port 18 and consequently the supply of pressure fluid through port 16 and passage 13 to piston 25a just before piston 26a abuts against the end wall of chamber 20a.

It is apparent from the foregoing description of the piston meter that it comprises a minimum number of operating parts which are not subjected to excessive wear; hence the possibility of maintaining great accuracy in the measuring of the fluid passing through the meter. If any discrepancy arises or exists when the meter is first placed in operation, it may be compensated for by the simple adjustment of an auxiliary piston displacement element in the housing 7, Figs. 1 and 13 of the drawings, such as is shown in Patent No. 1,949,006 granted February 27, 1934 to W. S. Brubaker, port 15a being provided for connection to cylinder 7.

The above described metering device is especially adapted for metering liquids, and may be utilized as a bulk meter or service pump meter as it can be constructed in various sizes to accommodate flow lines of different capacity.

I claim:

1. In a liquid measuring device a plurality of measuring cylinders having their axes in parallel relation and having axially spaced ports with communicating flow passages, hollow pistons operatively disposed in said cylinders having axially spaced heads dividing each of said cylinders into end compartments, a central compartment and intermediate compartments, the latter being communicative through the hollow pistons, a common inlet passage in radial alignment with one of each of the intermediate compartments of said pair of cylinders whereby the inlet pressure may be directed from said intermediate chambers through the flow passages to the end chambers of said cylinders to actuate the pistons for reciprocatory movement, the flow passages from said end chambers communicating with the central compartments of the cylinders, and said cylinders having a common outlet communicating with said central compartments whereby the fluid displaced from the end chambers of said cylinders is delivered to said common outlet and means connecting said pistons for correlating their movements.

2. In a liquid measuring device, a plurality of measuring cylinders having their axes in parallel relation, said cylinders having axially spaced ports and intercommunicating flow passages for said ports, pistons operatively disposed in said cylinders having axially spaced heads dividing each cylinder into end compartments, a central compartment and compartments intermediate the central and end compartments, said pistons having hollow central passages communicating with said intermediate compartments, said cylinders having a common inlet passage communicating with an intermediate compartment of each of said cylinders and having a common outlet communicating with the central compartments of said cylinders, the end compartments of the cylinders constituting displacement chambers for measured quantities of liquid and said intermediate compartments constituting valve chambers for directing the flow of inlet fluid to said end compartments while controlling the discharge passages of the end compartments to deliver the displaced fluid to said common outlet and means connecting said pistons for correlating their movements.

3. In a liquid measuring device, a plurality of measuring cylinders having their axes in parallel relation, said cylinders having axially spaced ports and intercommunicating flow passages for said ports, pistons operatively disposed in said cylinders having axially spaced heads dividing each cylinder into end compartments, a central compartment and compartments intermediate the central and end compartments, said pistons having hollow central passages communicating with said intermediate compartments, a common inlet passage for said cylinders in constant communication with an intermediate compartment of each of said cylinders, a common outlet passage in constant communication with the central compartments of said cylinders, the end compartments of the cylinders constituting displacement chambers for delivering measured volumes of fluid to the central compartments, and said intermediate compartments constituting valve chambers for controlling the application of inlet pressure through the axially spaced ports of the cylinders to the end compartments to thereby regulate the movement of the pistons in said cylinders relative to each other to provide a constant and continuous flow of fluid through said measuring device and means connecting said pistons for correlating their movements.

4. In a liquid measuring device, a plurality of measuring cylinders having their axes in parallel relation, said cylinders having axially spaced ports and intercommunicating flow passages externally of said cylinders, pistons operatively disposed in said cylinders having axially spaced heads dividing each cylinder into end compartments, a central compartment and compartments intermediate the central and end compartments, said pistons having hollow central passages communicating with said intermediate compartments constituting flow passages therebetween and having slotted yokes, a register drive shaft having cranks interacting with the slots of said yokes, a common inlet passage for said cylinders in constant communication with an intermediate compartment of each of said cylinders and a common outlet passage in constant communication with the central compartments of said cylinders, the cranks being 90° apart and the slots of the piston yokes being offset to control relative movement of the pistons.

5. In a liquid measuring device, a housing having a pair of measuring cylinders with their axes vertically disposed relative to the base of the housing, said cylinders having their axes in parallel relation and having axially spaced ports and communicating flow passages in the housing walls, pistons operatively disposed in said cylinders having axially spaced heads dividing each of the cylinders into a plurality of compartments, there being end compartments, central compartments and compartments intermediate the end and central compartments, one of the intermediate compartments of each cylinder being of greater volume than the other of its intermediate compartments, a common inlet passage for said cylinders in constant communication with the larger of the two intermediate compartments of said cylinders, and a common outlet in constant communication with the central compartments of said cylinders, said pistons being hollow to provide flow passages between the intermediate compartments of said cylinders, inclined slots in the piston members, and a crank shaft having rollers on the cranks thereof disposed in the slots of said pistons.

6. In a liquid measuring device, a housing having a pair of measuring cylinders with their axes vertically disposed relative to the base of the housing, said cylinders having their axes in parallel relation and having axially spaced ports and communicating flow passages in the housing walls, pistons operatively disposed in said cylinders having axially spaced heads dividing each of the cylinders into a plurality of compartments, there being end compartments, central compartments and compartments intermediate the end and central compartments, one of the intermediate compartments of each cylinder being of greater volume than the other of its intermediate compartments, an inlet connection and an outlet connection for said housing, the inlet connection having a flow passage common to said cylinders in constant communication with one of said intermediate compartments of each cylinder, and the outlet connection having a flow passage in constant communication with the central compartments of said cylinders, the end compartments of the cylinders functioning to displace measured volumes of fluid through the outlet passage of the housing, and the intermediate compartments of the cylinders constantly shifting in response to the movement of the pistons to control the flow of the inlet fluid from the inlet passage to the end displacement chambers of said cylinders and means connecting said pistons for correlating their movements.

7. In a liquid measuring device, a housing having a pair of measuring cylinders with their axes vertically disposed relative to the base of the housing, said cylinders having their axes in parallel relation and having axially spaced ports and communicating flow passages in the housing walls, pistons operatively disposed in said cylinders having axially spaced heads dividing each of the cylinders into a plurality of compartments, there being end compartments, central compartments and compartments intermediate the end and central compartments, one of the intermediate compartments of each cylinder being of greater volume than the other of its intermediate compartments, a common inlet passage for said cylinders in constant communication with the larger of the intermediate compartments of said cylinders, and a common outlet in constant communication with the central compartments of said cylinders, said pistons being hollow to provide a flow passage between the intermediate compartments of said cylinders, the end compartments of the cylinders constituting displacement chambers for measured quantities of liquid, and said intermediate compartments constituting valve chambers for directing the flow of inlet fluid to said end compartments while controlling the discharge passages of the end compartments to deliver the displaced fluid to the common outlet and means connecting said pistons for correlating their movements.

8. In a liquid measuring device, a housing having a pair of measuring cylinders with their axes vertically disposed relative to the base of the housing, said cylinders having their axes in parallel relation and having axially spaced ports and communicating flow passages in the housing walls, pistons operatively disposed in said cylinders having axially spaced heads dividing each of the cylinders into a plurality of compartments, there being end compartments, central compartments and compartments intermediate the end and central compartments, one of the intermediate compartments of each cylinder being of greater volume than the other of its intermediate compartments, a common inlet passage for said cylinders in constant communication with the larger of the two intermediate compartments of each cylinder, and a common outlet in constant communication with the central compartments of said cylinders, said pistons being hollow to provide flow passages between the intermediate compartments of said cylinders, inclined slots in the pistons, a crank shaft and cranks connecting the pistons, said shaft being geared to a register drive mechanism and the cranks of the shaft having connection with the slots of the pistons.

LYON McCANDLESS.